Nov. 29, 1955  G. A. BRACE  2,725,114
CONTROL DEVICE FOR SUCTION CLEANERS
Filed Jan. 14, 1954  2 Sheets-Sheet 2

United States Patent Office 2,725,114
Patented Nov. 29, 1955

2,725,114

CONTROL DEVICE FOR SUCTION CLEANERS

George A. Brace, Highland Park, Ill., assignor to The Hoover Company, North Canton, Ohio, a corporation of Ohio Application January 14, 1954, Serial No. 403,985

13 Claims. (Cl. 183—37)

This invention relates to suction cleaners and more particularly to an automatic mechanism for indicating at the start of a cleaning operation whether the filter is too dirty for effective operation and for requiring the user to replace or clean the filter before proceeding to use the cleaner.

One of the vexatious problems attending the use of suction cleaners is knowing when to clean the filter. Generally speaking, housewives do not appreciate the importance of cleaning or replacing the filter as frequently as necessary to maintain a desirable suction pressure and the optimum cleaning effectiveness. And, of course, economic factors are involved where throw-away paper filters are employed since users tend to use a dirty filter longer than is desirable for reasons of economy.

In the case of the tank type cleaner, clean filters are of the greatest importance due to the much smaller filter bag customarily employed. Its rather restricted filter area becomes filled with fine dirt after a shorter period of use than the larger filters used with upright cleaners. Moreover, the user cannot easily nor conveniently determine the condition of the filter in a tank cleaner because it is not exposed to view nor can the operator squeeze the bag to determine the quantity of collected dirt as is customary with upright filters. Moreover, the time honored methods of testing by feeling the quantity or by lifting the filter to estimate the weight of collected dirt are quite unreliable and misleading; and this is particularly true of tank type cleaners. The reason for this is that a relatively small quantity of very fine dirt can so clog the pores of the filter as to render the cleaner totally ineffective for further cleaning.

The foregoing and related problems have long been recognized and many solutions have been proposed. The more common practice has been to provide a device for measuring the back pressure within the filter since an increase in this pressure is indicative of a clogged or dirty filter. However, these devices have not enjoyed commercial success for numerous reasons among which may be mentioned their lack of adequate sensitivity, tendency to become clogged with dirt, failure to prevent continued use of the cleaner after the need for filter change has been determined, as well as their over-all complexity, high cost and service maintenance problems.

Another class of controls measures the pressure drop across the filter and sounds a signal or actually ejects the dirty filter when the control mechanism indicates that this is desirable. These have numerous disadvantages including marked complexity and bulkiness, high cost, delicate calibration and inability to distinguish between different operating conditions, as for example, when the nozzle is momentarily lifted from the surface being cleaned or when it is moved from a relatively non-porous to a thin porous fabric.

The present invention provides a control designed to circumvent the foregoing and other disadvantages of prior devices and to provide a control which is automatic, compact, simple in construction and operation, and which is not subject to the premature and false indicating characteristics of prior controls.

In brief, the present control is designed to test the filter condition immediately after the cleaner has reached a stable operating condition. If the filter is then in a satisfactory condition, the operator may proceed to use the cleaner without fear that the cleaning operation will be interrupted or that a signal light will flash or a gong will sound requiring her to choose between stopping to replace the filter or proceeding to clean plagued by the flashing light or the gong. Some prior devices deny her this choice by ejecting the dirty filter onto the floor even though the cleaning operation may be nearly completed. The operator is then forced to dispose of the ejected bag and install a new one.

The present invention avoids these very aggravating occurrences by testing the condition of the filter at the very start of the operation. If the filter is then too dirty, the control functions to so advise the user as well as to prevent the operation of the cleaner until the filter is reconditioned or replaced. But if the filter is in usable condition, the testing mechanism is locked out of operation until the cleaning operation has been completed. Consequently, the operator may proceed without fear of being interrupted even though the inefficient operating condition of the filter is reached during the cleaning period. However, this short period of operation with a filter in need of changing is not objectionable.

Another feature of the device is a positive indicator which is projected into view as the control de-energizes the cleaner upon finding that the filter is unsuitable for further use. This indicator instructs the replacement of the filter and resets automatically as a necessary incident to the reenergization of the cleaner.

Accordingly, it is a primary object of this invention to provide a novel control mechanism for a suction cleaner which tests the condition of the filter at the start of a cleaning operation.

Another object is the provision of a suction cleaner control which requires the replacement or reconditioning of the filter before the cleaner can be used if the filter is in an inefficient condition at the start of the cleaning operation.

Still another object is the provision of means for deactivating a suction cleaner if the pressure drop across the filter at the start of the cleaning operation exceeds a value indicative of a dirt clogged filter and, if it does not, to prevent deactivation of the cleaner merely because the filter becomes dirty during use.

A further object is the provision of a filter condition testing device incorporating a signal to notify the user of an unsatisfactory filter condition as well as means for preventing use of the cleaner until the condition is remedied.

Another object is the provision of a suction cleaner with a combined filter condition determining mechanism and a cleaner control of compact, rugged design having new and unique functions.

Numerous other advantages and objectives will become apparent from the following detailed specification of an illustrative embodiment taken in connection with the accompanying drawings wherein.

Figure 1:
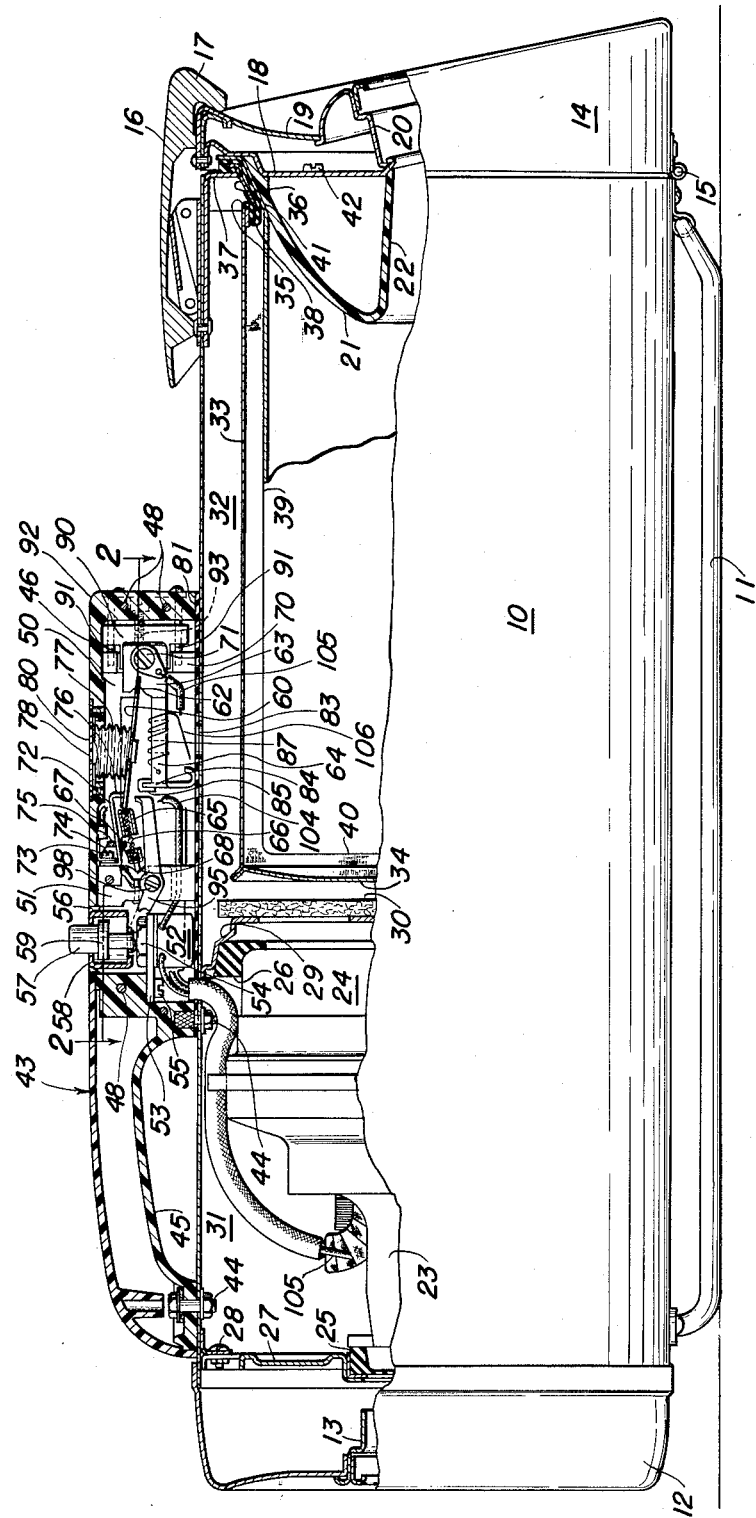
Figure 1 is a side elevational view partly in section showing a tank cleaner incorporating the invention with the main motor control switch in open position.

Referring to the drawings, it will be seen that the invention is shown as incorporated in a conventional type tank cleaner having a main casing 10 supported on a pair of skids 11. The exhaust end of the casing is normally closed by a rear end cap 12 having a combined hose coupling socket and exhaust air passage 13 opening through the end thereof. The front end of the cleaner is similarly closed by an end cap 14 hinged thereto by a hinge 15. This cap is normally held closed against the end of the casing by a conventional toggle clamp 16 having a hooked end 17 engageable over the rim of the cap as shown in Figure 1. The end cap includes inner and outer walls 18 and 19 between which the suction hose coupling socket 20 is supported in a well known manner. Secured to the inner wall 18 is a frusto-conical filter pilot and clamping member generally designated 21 having a gradually expanding air inlet passage 22 which forms an extension of the hose coupling member 20.

The suction unit mounted in the rear end of the casing comprises an electric driving motor 23 coupled to a multiple stage fan 24. This unit may be suspended in resilient mounting rings 25 and 26 in the manner clearly illustrated in Figure 1. Ring 25 is carried by a spider plate 27 secured to the casing by bolts 28, while mounting gasket 26 is cradled in a ring 29 suitably held in assembled position within casing 10. A final filter pad 30 is carried over the central opening of ring 29 and this communicates with the usual axially disposed air inlet for fan 24. While the exhaust air ports for the fan have not been illustrated, it will be understood that these are of conventional character and may open through the side wall of the fan chamber or axially of the unit so as to pass through the motor to cool the same as the air flows toward the exhaust air outlet 13.

Ring 29 and final filter 30 serve to separate the cleaner into a relatively small motor-fan unit compartment 31 and a relatively large filter chamber 32 at the opposite end of the cleaner. In the arrangement here illustrated, the filter chamber houses a cloth filter bag 33 having a closed inner end 34 and an open mouth 35 suitably secured to a flanged mounting ring 36 which is removably seated on an inturned flanged ring 37 permanently secured to the open end of the cleaner casing. Preferably, mounting ring 36 includes a resilient covering 38 of sheet rubber, plastic material or the like. This gasket may be suitably shaped or preformed to embrace the inner and outer rim edges of ring 36 as well as to overlie the inner side wall of the ring. Of course, the inturned flange of ring 37 provides a supporting ledge for the cloth filter in accordance with well known practice.

The principal filter bag 39 of porous paper has a shape and size similar to the cloth filter bag but is preferably slightly smaller so as to telescope readily into the cloth filter during its assembly and disassembly therefrom. Like the cloth bag, it has a flat bottom 40 and a large diameter inlet mouth 41 adapted to be pressed into airtight sealing engagement with the side wall portion of gasket 38. The mouth of the paper filter is held in this position by the juxtaposed portion of pilot member 21 secured to the inner wall of the end cap as by screws 42. It will be quite apparent that the rounded, frusto-conical pilot 21 enters the large mouth of the paper filter and gradually expands it outwardly into seating contact with gasket 38 as the end cap closes. Likewise, upon release of toggle clamp 16 and the opening of the end cap, the pilot is withdrawn from the mouth of the filter leaving it completely free for withdrawal from the filter chamber. The opening of the end cap also releases the pressure on the outwardly flaring rim of ring 36 so that it likewise may be withdrawn if the operator wishes. Normally, the preferred practice is to use the cleaner with both the paper and cloth filter. However, such double filter use is not essential and the paper filter may be omitted in which case the dirt is collected directly in the cloth filter.

My novel automatic control mechanism and filter condition testing mechanism will now be described. Referring first to Figure 1, it will be seen that a hollow housing generally designated 43 is fixed to the upper wall of the cleaner casing as by assembly bolts 44, 44. The left hand end of housing 43 comprises a hand grip 45 overlying the center of gravity of the cleaner and forming a carrying handle by which the cleaner may be carried from place to place. Projecting from the forward end of the hand grip 45 is a hollow housing 46 within which the control mechanism proper is encased. The lower side of housing 46 is open when removed from the cleaner but is, of course, closed by the cleaner casing when assembled thereto through a resilient airtight sealing gasket. One side wall of housing 46 is also open as manufactured but is normally closed by a removable cover 47 held in place by screws 48.

Before proceeding with a detailed description of the control mechanism, it will be helpful to describe it in general terms. The mechanism comprises two switches connected in series with the cleaner motor. The first of these is the usual manually operated push-push type of switch which opens or closes the motor each time its button is depressed. The second switch is also of the snap action type and is normally closed unless the filter is found clogged with dirt at the start of a cleaning operation. In this event, a pressure sensitive bellows acts in response to an abnormally low pressure in the filter chamber to open the snap action switch connected thereto. However, should the filter be in a proper operating condition as the cleaner comes up to operating speed, a time delay device functions to lock the snap action switch closed and to keep it closed for the duration of the cleaning operation even though the filter should become too dirty for efficient operation. If the filter is found to be too dirty at the beginning of the cleaning operation, the opening of the snap switch not only opens the motor circuit but actuates a signal device to advise the operator to change the filter. With these functions in mind the structure for carrying the same out will be described.

As clearly shown in the drawings, the molded plastic housing 46 is divided into a small chamber 49 and a relatively large chamber 50 by a thick partition 51 integral with the housing itself. A conventional type push-push switch 52 is assembled to a supporting bracket 53 by a nut 54. The bracket 53 is in turn anchored to housing 46 by one or more mounting screws 55. The switch operating plunger extends upwardly from the top side of the bracket and projects through an opening 56 in the top wall of housing 46 and terminates in a push button 57.

Figure 3:
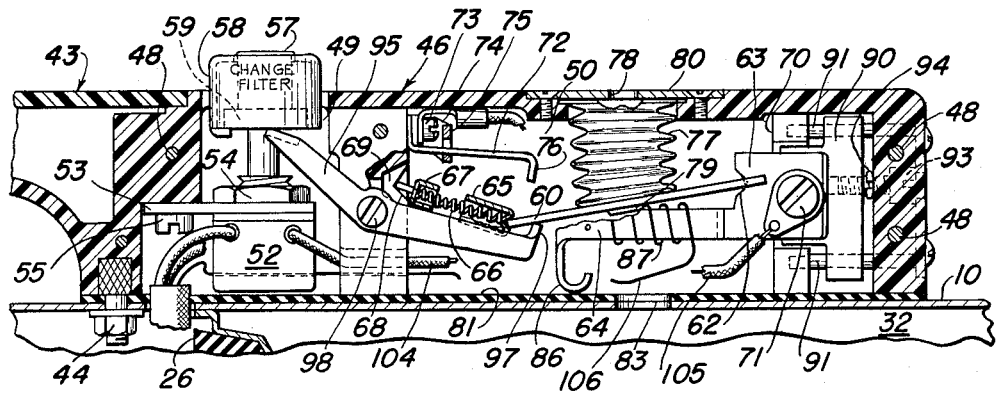
Figure 3 is a vertical sectional view through the control mechanism with the pressure responsive switch in open position and the filter indicating signal in its extended position.

My signal condition indicating device includes a cylindrical sleeve 58 held captive on push button 57 by means of a flange 59 in cooperation with the inturned upper and lower rims of the sleeve. Normally, the sleeve is in retracted position within housing 46 and is not visible to the operator. However, when the filter is found to be clogged with dirt, the opening of the snap action switch serves to elevate sleeve 58 to its extended position as illustrated in Figure 3 in a manner which will be explained later.

Referring now to chamber 50 containing the filter testing and cut-off mechanism, it will be seen that the snap action mechanism comprises a rigid metal strip 60 having a forked end 61 seated in a notch 62 formed in the enlarged end 63 of a bi-metallic thermal element 64. The opposite end of strip 60 seats in the cupped end of a cap 65 seated over the end of a compression toggle spring 66. The other end of the toggle spring seats in a cap 67 having an axial tang arranged to pivot in a notch 68 of a rivet head 69 secured to partition wall 51.

It will thus be clear that a toggle spring 66 and strip 60 have their opposite ends supported in V notches 68 and 62, respectively and form a snap action toggle link. This link has a neutral axis passing through notches 62 and 68. When the axes of spring 66 and strip 60 are in direct alignment with one another and with this neutral axis of notches 62 and 68, the toggle link is in its neutral or dead center position. As soon as the link is moved in either direction above or below this neutral axis, spring 66 is effective to continue the movement in the same direction with a snap action until the movement is arrested. It is, of course, understood that notch 68 is anchored in the partition wall 51 and that the right hand end 63 of the thermostatic member 64 is likewise anchored to a vertical wall 70 by means of screw 71.

The means for limiting the upward movement of the snap action mechanism comprises a resilient Z-shaped switch blade 72 having one end anchored to partition 51 by a terminal screw 73. This screw also serves to support a strip 74 having a forked end 75 straddling switch blade 72 and cooperating therewith to limit its arcuate movement. The downturned free end 76 of blade 72 is positioned to contact strip 60 when the toggle link is above its neutral axis. Under these conditions, toggle spring 66 moves strip 60 upwardly until the upper arm of fork 75 acts on blade 72 to limit further upward movement. Normally, spring 72 is so stressed as to tend to lie against the lower side of fork 75 as the toggle link moves downwardly below its neutral position as it does when the filter is found to be too dirty at the beginning of a cleaning operation.

The means for actuating the toggle link to open switch 72 when the filter is dirty comprises a soft rubber bellows 77 interposed between the top side of strip 60 and the top wall of housing 46. The bellows is closed except for an inlet vent opening 78 formed in a plate 80 securing the rim of the bellows to an opening in the top wall of housing 46. The closed bottom wall of the bellows is provided with a button 79 extending through an opening in strip 60 and serving to anchor the bellows firmly thereto.

Thus, it will be clear that the bellows forms a complete air seal between the interior of chamber 50 and vent opening 78 to the outside atmospheric air. It will, of course, be understood that housing 46 is held in airtight sealing engagement with the top of the cleaner casing by a resilient gasket 81, and that chamber 50 is sealed from communication with chamber 49 by partition 51 and a soft sponge rubber gasket 82 held compressed against the end of partition 51 by cover plate 47 in the manner best shown by Figure 2. Chamber 50 is in communication with filter chamber 32 through a small opening 83 in the cleaner casing and sealing gasket 81. As a result, any abnormally low pressure in filter chamber 32 will be communicated directly to chamber 50 and will be effective throughout the exterior area of bellows 77. At the same time, vent 78 will place the interior wall of bellows 77 in direct communication with the outside atmospheric air. When this pressure differential becomes sufficient to overcome toggle spring 66 it will tend to move the snap action linkage downwardly toward or even past its neutral position and open switch 72 provided the lockout formed by the thermal element 64 is not in a position to block the movement of the bellows.

Figure 2:
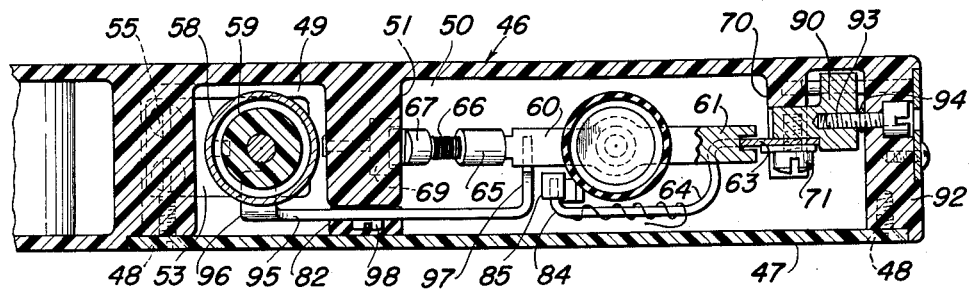
Figure 2 is a horizontal sectional view through the control mechanism taken along line 2—2 on Figure 1.

The lockout device provided by the bi-metal 64 and its mode of operation will now be described. The shape of the bi-metal is clearly illustrated in Figures 1 and 2 showing a side elevational and plan view, respectively. End 63 of the bi-metal is rigidly anchored to partition wall 70 by screw 71 while its opposite end is free to flex horizontally crosswise of the path of movement of toggle linkage formed by strip 60 and spring 66. When the thermal element is cold and the cleaner is not operating, element 64 occupies the position best shown in Figure 2 wherein its free end 84 is positioned to one side of strip 60. However, if the element is heated to a temperature considerably above normal room temperature, its free end flexes inwardly to a position underlying strip 60 of the toggle link. The uppermost edge of end 84 is capped by a U-shaped strip of insulation material 85 while the opposite lower edge 86 of the bi-metallic element is curled upwardly to provide a broad rounded support resting lightly against gasket 81. Surrounding the main body of the thermal element is an electrical resistance heater 87 having one end welded to the thermal element itself. It will, of course, be understood that this resistance element is suitably electrically insulated from the thermal element and that it is covered with heat insulating material to prevent excessive radiation of heat.

Another feature of the control is a manual adjustment mechanism for changing the suction pressure at which the bellows is effective to open switch 72 and deactivate the motor-fan unit. As best shown in Figures 2 and 3, a T-shaped cross-head 90 has the opposite ends of its head slidably mounted on a pair of pins 91, 91 having one end supported by partition 70 while the opposite ends are received in openings in the end wall 92 of housing 46. The forked end 61 of toggle strip 60 is seated in a notch 62 formed in end 63 of the thermal element which, in turn, is anchored to the leg of cross-head 90 by screw 71.

The means for adjusting the position of cross-head 90 comprises an adjustment screw 93 projecting through end wall 92 and having threaded engagement with cross-head 90. A split ring keeper or its equivalent 94 is seated in a groove on screw 93 immediately inside the inner side of wall 92. It will therefore be clear that as screw 93 is turned clockwise or counter-clockwise, sliding member 90 will shift along guide pins 91, 91 to change the pressure acting on toggle spring 66. Decreasing the pressure acting on this spring will enable the toggle to operate on a lower differential whereas changing the adjustment to increase the compression forces on the spring will prevent the toggle switch from opening until a much higher pressure obtains. Stated differently, decreasing the toggle spring pressure enables the toggle to open at a higher sub-atmospheric pressure in chamber 32 than is the case if the toggle spring pressure is increased.

The signal device for informing the operator when the filter is dirty and in need of changing comprises a sleeve 58 surrounding switch push button 57 and a pivoted lever 95. As best indicated in Figures 2 and 3, lever 95 has a tang 96 at one end underlying the lower rim of sleeve 58 and a second tang 97 at its other end underlying the left hand end of toggle strip 60. Lever 95 is pivotally supported on partition 51 by means of a pivot screw 98 the head of which is normally embedded in the soft rubber sealing gasket 82 interposed between cover plate 47 and the end of partition wall 51. Normally, lever 95 occupies the position shown in Figure 1 wherein the indicator sleeve 58 is concealed within the body of housing 46. Under these conditions, the top edge of tang 97 is slightly above the neutral position of toggle linkage elements 60 and 66. Consequently, should this linkage move downwardly below the neutral position, it will contact tang 97 and pivot lever 95 clockwise thereby elevating indicating sleeve 58 to its extended signalling position. The side wall of the sleeve is preferably painted a distinctive color such as red and is provided with a suitable directive such as "Change Filter." This directive is so positioned as to be fully exposed when the indicator is in its extended position flush with the top of switch button 57.

Figure 4:
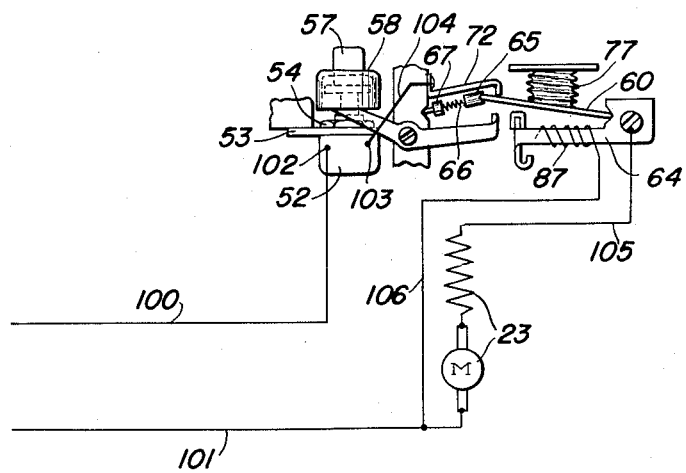
Figure 4 is a schematic wiring diagram of the control and the cleaner motor-fan unit.

The manner in which the control device is connected in circuit with the cleaner motor is shown in Figure 4. Lead wires 100 and 101 are connected to a suitable source of power supply. Wire 100 is connected directly to one terminal 102 of push-push switch 52. The other terminal 103 of this switch is connected by a wire 104 to the assembly screw 73 for the spring switch contact 72. The moving contact terminal 76 of this switch normally rests directly against the upper side of toggle strip 60 which forms part of the power circuit for the cleaner motor. Current flows through this strip to the thermal element 64 and through the conductor wire 105 directly to the field of the electric motor 23. The other side of the motor is connected directly to the other power line 101. The sole remaining connection is wire 106 interconnected between electric heating element 87 for the thermostat and the power source wire 101. It will thus be clear that manually operable push-push switch 52 and the toggle switch 72 are connected in series with the motor across the power line while the heating element is connected in parallel with the motor as well as in series with both of the above mentioned switches.

Operation

Normally the parts are positioned as illustrated in Figure 1. To place the cleaner in operation, the operator attaches the suction hose to coupling 20 and depresses button 57 to close push-push switch 52 so that current flows to the motor through lead wires 100, 104, spring contact 72 of the snap action switch, strip 60, thermal element 64, lead wire 105 and lead wire 101. Since heater element 87 surrounding the bi-metal element is in parallel with the motor through thermal element 64 and lead wire 106, it will be apparent that it is also energized simultaneously with the motor.

The motor comes up to operating speed within a very brief interval and reduces the pressure in filter chamber 32 causing air to flow into the hose, through filter walls 39 and 33, and into the fan chamber. The air will also be evacuated from chamber 50 through opening 83 to equalize the pressure in these two chambers. Assuming that both filters are in a clean condition initially, the pressure exteriorly of outer filter 33 will be at a normal sub-atmospheric operating level. This pressure acting on the exterior of bellows 77 within chamber 50 together with the atmospheric pressure acting on its interior walls through opening 78 will tend to move the bellows downwardly in opposition to toggle spring 66 of the snap action mechanism. However, this normally existing differential is insufficient and the snap action device will remain substantially in the position illustrated in Figure 1 and switch 72 will remain closed. In fact, spring 72 maintains electric contact with strip 60 until the spring strikes the lower arm of the forked strip 75. Accordingly, the cleaner motor remains energized along with the resistance heater 87. After a brief period of time thermal element 64 will become heated and end 84 will flex to a position beneath strip 60 thereby preventing the snap action mechanism from moving downwardly past its neutral position to open the motor fan circuit. This lock-out operation of the thermal element takes place within a short interval such as one minute after the motor is first energized. Since switch 72 is now locked in closed position, the heater remains connected in the electrical circuit and maintains the thermal element hot and in its position beneath strip 60 until the operator opens the main control switch 52.

The motor may be stopped and started as many times as the operator wishes without changing the operation of the parts just described. Eventually however, the filter will become too dirty for further efficient operation. In order to better understand the operation of my novel filter testing apparatus, let us assume that the filter has passed its efficient operating condition during the previous use of the cleaner and that the operator is now ready to resume cleaning. Proceeding as before, she depresses button 57 and closes main switch 52. As the motor comes up to operating speed the pressure in filter chamber 32 will fall to an obnormally low value since filter bag 39 is clogged with dirt. This abnormally low pressure condition within the filter chamber will be established within a matter of seconds after the motor is energized and will be transmitted to chamber 50 by way of opening 83. This abnormally low pressure together with the atmospheric pressure acting on the interior of bellows 77 is more than adequate to move the snap action mechanism past its neutral position. As it snaps downwardly past its neutral axis, the lower arm of fork 75 will arrest the movement of spring terminal arm 72 and open the circuit to the motor as well as to the heating element 87.

During the brief interval that the circuit was closed, heating element 87 will not have heated the thermostat 64 sufficiently for it to flex beneath strip 60 and prevent the opening of the snap action device. As the latter snaps downwardly under the influence of spring 66, strip 60 will contact tang 97 of lever 95 to pivot the latter clockwise and lift indicator sleeve 58 to its extended position shown in Figure 3. The stopping of the cleaner motor a few moment after it was started together with the appearance of the brilliantly painted indicator sleeve 58 with its message to change the filter provides a triple notice to the user that the filter needs changing or cleaning.

The changing of the filter and its replacement by a clean bag or a new one is accomplished very expeditiously. The operator merely up-ends the cleaner onto rear end cap 12 and releases toggle clamp 16 so that cap 14 can be swung to open position. The rim of filter 39 is then grasped by the fingers and withdrawn for cleaning or for replacement by a brand new filter. As the end cap is closed, the pointed end of pilot 21 enters the mouth of the filter bag and gradually expands it into airtight sealing engagement with gasket ring 38. Toggle clamp 16 is then closed to lock the cap in place.

The cleaner is then returned onto skids 11 and button 57 is depressed to start the motor. However, as made clear by Figure 3, button 57 cannot be depressed without simultaneously lowering sleeve 58. As sleeve 58 is lowered, it acts on lever 95 and to elevate the snap action members 60 and 66 above their neutral axis thereby re-establishing electrical contact between strips 60 and 72. It will therefore be clear that the closing of main switch 52 automatically resets both the snap action switch and the dirty filter signal device.

Even an operator who is unfamiliar with the nature of the control device cannot fail to know that the changing of the filter is required because she cannot gain access to push button 57 to restart the motor without seeing the distinctively colored sleeve 58 and the message thereon advising her to change the filter. And if she disregards the signal and re-starts the cleaner, it will only operate for a few seconds before stopping and extending the dirty filter signal.

Previous dirty filter indicators are subject to the serious disadvantage that they can be activated during the normal use of the cleaner so as to give a false indication of a dirty filter. Such a possibility is avoided by the present control which measures the condition of the filter at the moment the cleaner is started and before the operator has an opportunity to use the tools in a manner to give such a false indication. For example, if the user were to press the suction nozzle lips tightly against some object so as to cut off substantially all air flow, even momentarily, a device for measuring the pressure differential across the filter would be activated to give a false indication of a dirty filter. This possibility is circumvented in my control since the testing of the filter condition takes place immediately after starting the motor and before the operator has an opportunity to pick up the suction wand and bring the nozzle into air sealing engagement with some object.

If for any reason the control should change so as to operate either too soon or tardily, it is a simple matter to change the setting of the filter testing mechanism to provide the desired operation. Thus, if the indicator operates to indicate a dirty condition too soon, the user turns the manual adjustment screw 93 inward to increase the tension on spring 66. Or if the tension is already so great that the indicator operates only after the filter has become excessively dirty, screw 93 is withdrawn slightly to decrease the pressure on spring 66 and enable bellows 77 to open switch 72 at a somewhat higher sub-atmospheric pressure in chamber 32 than previously.

From the foregoing it will be apparent that the present invention provides a very simple and rugged mechanism for testing the condition of the filter at the very start of a cleaning operation. If the test mechanism finds that the filter is too dirty for efficient operation, the control operates to de-energize the motor and to extend a signal advising the operator of this condition. The device provides a positive bar to the use of the cleaner until the filter condition is corrected. As soon as this occurs, the signal mechanism is automatically reset and the control mechanism generally is restored to its normal operating condition merely as an incident to the depression of the main switch button by the operator.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. In combination, a suction cleaner having a motor-fan suction unit, a filter chamber having a dirt filter mounted therein, said suction unit having an inlet communicating with one side of said filter, control mechanism for said suction unit including a manually operable switch, a normally closed snap-action switch connected in circuit therewith and with said suction unit, pressure responsive means connected to said snap-action switch for opening the same when the pressure in said filter chamber reaches a predetermined sub-atmospheric value indicative of a dirty filter condition, and means including a timer for locking said snap action switch closed after the expiration of a time interval measured by said timer, and means for initiating the operation of said timer simultaneously with the closing of said manually operable switch.

2. A suction cleaner comprising a casing housing a motor driven suction fan, a filter chamber in said casing having an air pervious filter therein extending across the path of air flow through said chamber and fan, a power supply circuit for said motor including therein a normally closed pressure responsive switch for opening said power circuit under unfavorable filter operating conditions, a lock-out device for holding said pressure responsive switch closed including a time delay device connected in said power circuit and to said lock-out device, said time delay device being operable to render said lock-out ineffective to prevent the opening of said pressure responsive switch for a predetermined time interval while said motor driven fan is energized, said interval being at least long enough to permit said pressure responsive switch to respond to an abnormal pressure condition in said filter chamber indicative of a dirt clogged filter and to open said power circuit to said motor, and manually operable means for closing said pressure responsive switch to re-establish the power supply to said motor after said dirty filter condition has been remedied.

3. A suction cleaner comprising a motor driven suction fan, a filter chamber having a filter bag therein in the path of a dirty air stream propelled through said chamber by said fan, a power control circuit for said motor including means therein for testing the dirt filtering effectiveness of said filter each time said motor is energized, said power circuit including a main control switch and a normally closed secondary control switch for controlling the operation of said cleaner, pressure responsive means for opening said secondary switch in response to an abnormal pressure condition in said filter chamber due to a clogged condition of said filter, and time delay means for locking said secondary switch closed after an interval of time following the closing of said main switch, said time interval being sufficiently long to permit a stable pressure condition to be established in said filter chamber following the closing of said main switch whereby said pressure responsive means will act to open said secondary switch and de-energize said cleaner if said stable pressure condition is abnormal due to a dirty filter and whereby said secondary switch will be locked closed at the end of said time interval if said pressure condition is within a normal range.

4. A suction cleaner comprising a motor driven suction fan, a filter chamber having a dirt filtering bag therein, means for conducting a dirty air stream into the interior of said filter bag, said suction fan having an inlet in communication with said filter chamber exteriorly of said filter, a control circuit for said motor including a manually operable main switch for starting and stopping said motor and a normally closed switch for de-energizing said motor if said filter is in an ineffective filtering condition when said manual switch is closed to start said cleaner in operation, means for opening said normally closed switch in response to an abnormal pressure condition on one side of said filter indicative of the ineffective filtering condition of said filter, and means energized by the closing of said manual switch for locking said normally closed switch closed after a time interval sufficient for the establishment of stable pressure conditions in said filter chamber whereby said motor is automatically de-energized by the opening of said normally closed switch if said filter is in an ineffective filtering condition at the beginning of a cleaning operation.

5. A suction cleaner incorporating means for testing the condition of its dirt filter at the start of a cleaning operation and signalling the operator if the filter is in need of cleaning comprising a motor driven suction fan, a filter bag having a dirty air inlet, means connecting the inlet of said fan to the exterior of said filter, a power control circuit for said motor including a manual switch for starting and stopping said motor and a normally closed switch for de-energizing said motor if said filter is in an inefficient condition when said manual switch is closed to initiate a cleaning operation, means responsive to an abnormal pressure condition on one side of said filter for opening said normally closed switch, a thermally responsive means for moving into and out of the path of movement of said normally closed switch as it moves between closed and open position, said thermal means being at one side of said path of movement before said cleaner is energized and having a heater therefor activated when said motor is energized for heating said element to move the latter into said path of movement in time delay sequence following the closing of said manual switch, and signal means responsive to the opening of said normally closed switch for giving notice to the operator that the filter is dirty and in need of cleaning.

6. A suction cleaner having a control mechanism for testing the filtering condition of a filter at the start of a cleaning operation and for deactivating the cleaner until the filter condition is corrected comprising a suction fan, a motor drive therefor, a dirt filter, means interconnecting said fan and said filter for the delivery of dirt laden air thereto and the removal of clean air therefrom, a control circuit for said fan motor including a normally closed switch therein, pressure operated means having a fluid connection to one side of said filter for opening said switch in response to an abnormal cleaner operating pressure on one side of said filter, manual switch means for starting and stopping said motor at the will of the operator, and time delay means activated by the closing of said manual switch to lock said normally closed switch in closed position a predetermined time interval after said manual switch is closed, said time interval being of sufficient duration to permit the establishment of stable pressure conditions on the opposite sides of said filter and the opening of said normally closed switch if said stable pressure condition is of a value representing a dirty filter condition.

7. The combination with a suction cleaner having a motor driven suction fan provided with an air inlet opening, a filter chamber having a dirt filter mounted therein, means connecting said fan opening to one side of said filter so that a dirty air stream can be conducted into said filter chamber on one side of said dirt filter and filtered air can be discharged from the other side thereof, of control means for rendering said suction fan inoperative when said filter becomes too clogged with dirt for efficient operation comprising a power control circuit for said motor including a pressure responsive switch connected to said filter chamber on one side of said filter and responsive to an abnormal pressure indicative of a dirt clogged filter to open the circuit to said motor, lock-out means for normally holding said pressure responsive switch closed, and time delay means for rendering said lock-out means ineffective to oppose the opening of said pressure responsive switch for an interval of time each time said cleaner is energized.

8. A suction cleaner having a cut-off control for deactivating the cleaner if the filter is in need of change at the start of a cleaning operation comprising a suction fan, a driving motor therefor, means including said fan forming a suction air passage, a dirt filter mounted across said passage for removing dirt flowing through said passage and causing a drop in the air pressure on the opposite sides thereof as the air is caused to flow therethrough by said suction fan, said drop in pressure being abnormally high when said filter becomes partially clogged with dirt, control means for said motor including a power circuit, means responsive to said abnormal pressure drop across said filter for opening said power circuit and de-energizing said motor, and means connected in said power circuit and energized when said motor is energized for rendering said power circuit opening means inactive a short interval of time following the energization of said motor, and manually operable means for reclosing said normally closed switch after said dirty filter condition has been remedied.

9. A suction cleaner as defined in claim 8 having a carrying handle secured to the exterior thereof and including a chamber enclosing said cut-off control.

10. A suction cleaner of the type having a casing, a suction unit for circulating a stream of air therethrough, a dirt filter arranged across said air stream within said casing to collect dirt from said stream, control means for said suction unit including pressure responsive means for deactivating the power supply thereto if the pressure drop across said filter exceeds a value indicative of a dirt clogged filter, and means for locking said pressure responsive means in closed position following a predetermined interval after said suction unit is energized whereby said pressure responsive means is free to test the condition of the filter when the cleaner is placed in operation but is inoperative to deactivate the cleaner if the filter is then in a proper operating condition.

11. A suction cleaner as defined in claim 10 wherein said means for locking said pressure responsive means in closed position comprises a timing device, means for activating said timing device simultaneously with the starting of said suction unit, said timing device including an element movable into blocking engagement with said pressure responsive means a predetermined interval after the starting of said suction unit.

12. A suction cleaner as defined in claim 10 including a signal device normally retracted to a non-signalling position, and means operatively interconnecting said signal and said pressure responsive means for moving said signal to the extended signalling position thereof upon the deactivation of said suction unit by said pressure responsive means.

13. A suction cleaner as defined in claim 12 wherein said pressure responsive means includes a normally closed electric switch and a snap action actuator therefor which is movable back and forth across a neutral position, said snap action element being normally positioned on one side of its neutral position, said signal being manually returnable to its retracted position and being operable during said return to restore said snap action element to its said normal position and to close said switch.

References Cited in the file of this patent

UNITED STATES PATENTS

| | | |
|---|---|---|
| 2,580,643 | Doughman | Jan. 1, 1952 |
| 2,625,239 | Senne | Jan. 13, 1953 |
| 2,634,819 | Cranmer | Apr. 14, 1953 |